US005604347A

United States Patent [19]

Petrick et al.

[11] Patent Number: 5,604,347

[45] Date of Patent: Feb. 18, 1997

[54] METHOD AND MEANS FOR COMPENSATING FOR ROW VARIABLE OFFSETS IN A LARGE AREA SOLID STATE X-RAY DETECTOR

[75] Inventors: Scott W. Petrick, Sussex; Lawrence R. Skrenes, Hartland; Jean C. Morvan; Paul R. Granfors, both of Milwaukee, all of Wis.

[73] Assignee: General Electric Company, Milwaukee, Wis.

[21] Appl. No.: 501,800

[22] Filed: Jul. 13, 1995

[51] Int. Cl.[6] .................... H04N 5/35

[52] U.S. Cl. .................... 250/252.1; 250/370.09

[58] Field of Search .................... 250/370.09, 370.11, 250/252.1 R; 378/207

[56] References Cited

U.S. PATENT DOCUMENTS

| | | | |
|---|---|---|---|
| 4,902,886 | 2/1990 | Smisko | 250/208.3 |
| 5,038,369 | 8/1991 | Nishiki | 250/370.09 |
| 5,120,964 | 6/1992 | Wieczorek | 250/370.09 |
| 5,184,018 | 2/1993 | Conrads et al. | 250/370.09 |
| 5,452,338 | 9/1995 | Granfors et al. | 378/207 |
| 5,483,071 | 1/1996 | Oikawa et al. | 250/370.09 |

*Primary Examiner*—Carolyn E. Fields

*Attorney, Agent, or Firm*—B. Joan Haushalter; John H. Pilarski

[57] ABSTRACT

Row variable offsets in a large area solid state x-ray detector are compensated for. Initially, a calibration is performed to determine the row variable offsets. The calibration is achieved by measuring the average offset of each row. During normal operation, this offset is compensated for in a converting circuit. The required signal range of the converting circuit is consequently reduced.

8 Claims, 3 Drawing Sheets

20
IMAGE PROCESSING SYSTEM
18
READOUT ELECTRONICS
24
SCANNING ELECTRONICS
18
READOUT ELECTRONICS
DETECTOR
12
30
10
28
26

METHOD AND MEANS FOR COMPENSATING FOR ROW VARIABLE OFFSETS IN A LARGE AREA SOLID STATE X-RAY DETECTOR

TECHNICAL FIELD

The present invention relates to x-ray detectors and, more particularly, to compensation for offsets in large area solid state x-ray detectors.

BACKGROUND ART

Large area solid state x-ray detectors are currently being developed in the x-ray art. Such a detector typically comprises a scintillating layer in contact with an array of photodiodes, each with an associated FET switch. The photodiodes are initially charged by connecting them to a known stable voltage by activating the FET switches. Subsequently, the photodiodes are isolated by turning off the FET switches. Upon exposure to x-rays, the scintillator produces light which discharges each photodiode in proportion to the x-ray exposure at the position of the diode. The diodes are then recharged by again connecting them to the known stable voltage. The charge used to restore the diode to its initial voltage is measured by a sensing circuit, and the value is digitized and stored.

In such a detector, the photodiodes and their associated FET switches are organized in rows and columns. The gates of the FETs along a row are connected together, and the row electrodes are connected to scanning electronics. During readout of the detector, rows of FETs are turned on sequentially, and an entire row of detector elements is read out at once. Because of imperfections in the FET switches, a time-dependent background current is generated when the FET switches are turned on and off. This results in an offset signal that is unrelated to the x-ray exposure. Because the rows are read out sequentially, a portion of this offset signal is row-correlated, i.e., it is the same for all elements in a row, but varies from row to row.

In the absence of offsets, the converting circuit would require only the range and resolution of signals generated by an x-ray exposure. In practice, the range of the offsets can be larger than the range of useful signals. For practical reasons, converting circuits have limitations in input signal range, conversion resolution, and conversion speed. In the absence of compensation for offsets, the converting circuit would be required to accommodate an increased input range without sacrificing resolution or speed.

It would be desirable, then, to have a means for compensating for row variable offsets in a large area solid state x-ray detector.

SUMMARY OF THE INVENTION

The present invention provides such a means for compensating for row variable offsets in a large area solid state x-ray detector, whereby the change in offset from row to row is independent of signal and can be measured or predicted.

In accordance with one aspect of the present invention, a method and apparatus are disclosed for compensating for row variable offsets produced by a large area solid state x-ray detector. Initially, a calibration is performed to measure the average offset of each row. Subsequently, an offset compensation value for each row is stored in the memory of a converting circuit. The stored compensation values are then added to the incoming signals during operation of the detector. Consequently, the required signal range of the converting circuit is reduced.

Accordingly, it is an object of the present invention to provide a means for compensating for row variable offsets produced by an x-ray detector. Other objects and advantages of the invention will be apparent from the following description, the accompanying drawings and the appended claims.

DETAILED DESCRIPTION OF THE PREFERRED EMBODIMENTS

Figure 1:
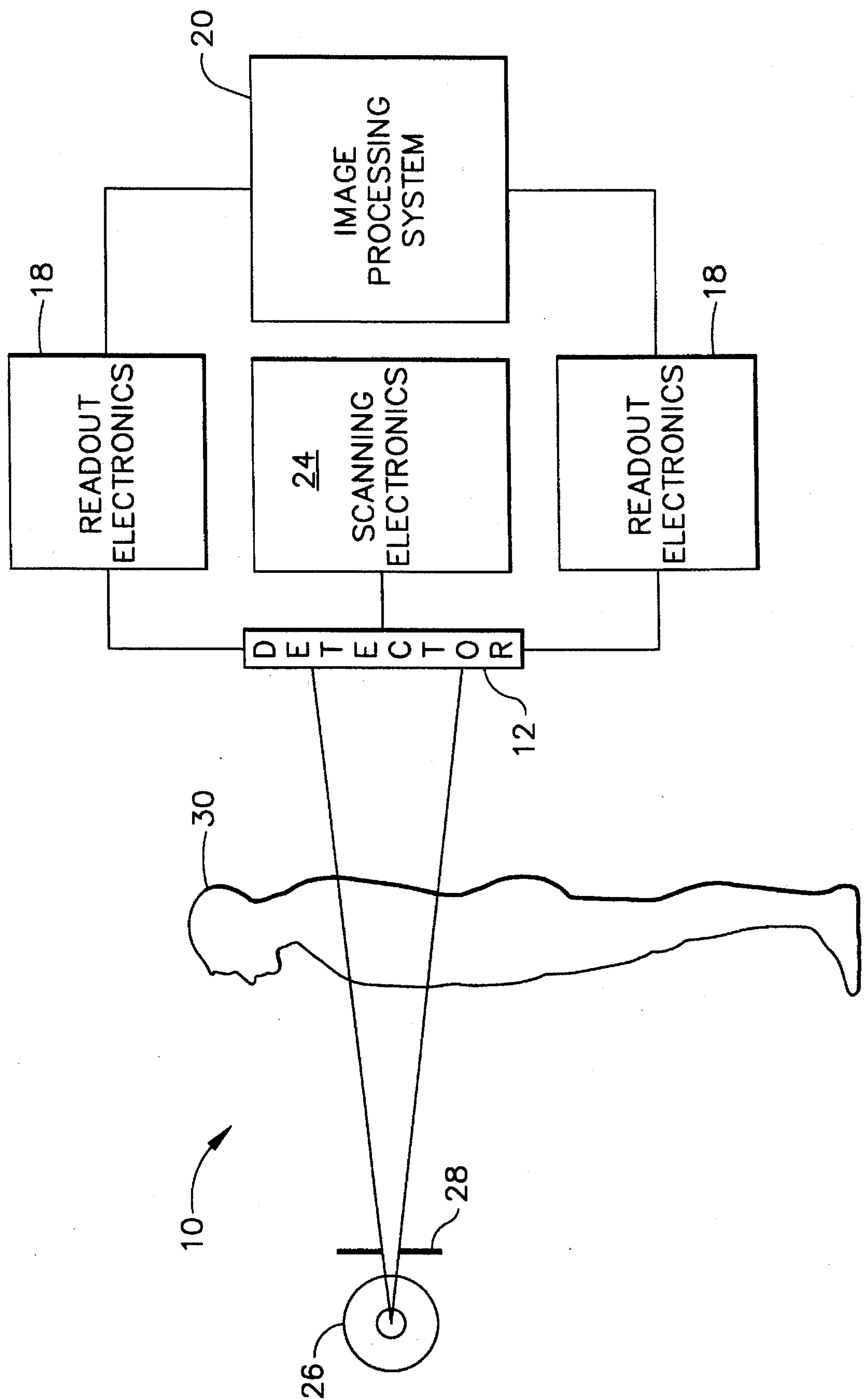
FIG. 1 is a block diagram of an x-ray imaging system.
Figure 2A:
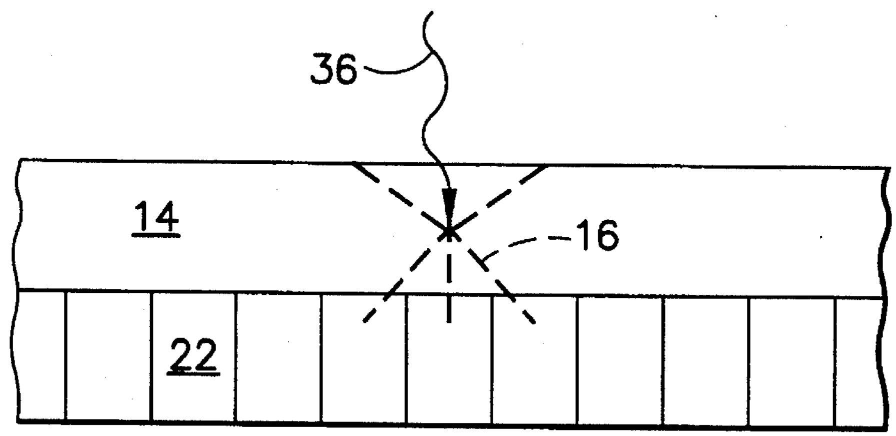
FIG. 2A illustrates detail of a solid state detector array shown in FIG. 1.

A large area solid state x-ray detector imaging system 10 is illustrated in FIG. 1. The imaging system comprises a detector 12 which includes a scintillator 14, as shown in FIG. 2A. The scintillator 14 converts x-ray photons 36 to light photons 16. Light photons are converted to electrical signals by photo detectors 22. Readout electronics 18 then convert the resultant analog signal to a digital signal that can be processed, stored, and displayed using well known image processing techniques and electronics, as illustrated by image processing system block 20. In FIG. 1, detector 12 receives x-rays produced by x-ray source 26, collimated by collimator 28, and transmitted through the object under study, such as a human patient 30.

Continuing with FIGS. 1 and 2A, in order to reduce the amount of readout electronics 18 required for the system 10, photo detector elements 22 are constructed such that they can integrate and store the analog signal until it can be processed by the readout electronics 18. Scanning electronics 24 provide control for the photo detector elements 22.

Figure 2B:
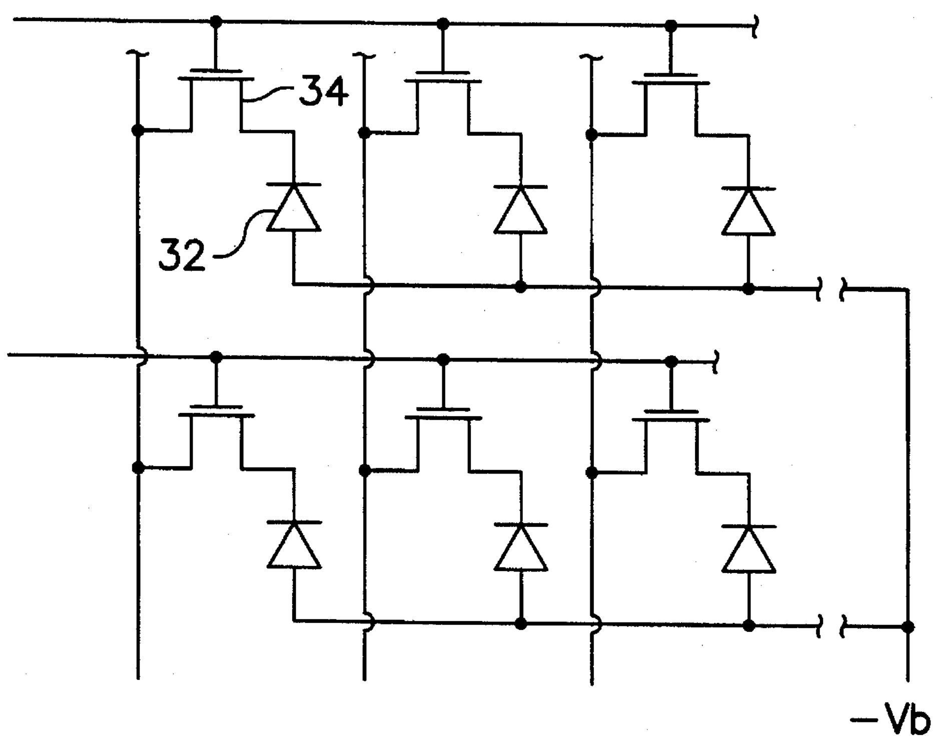
FIG. 2B illustrates a portion of the photo detector array of FIG. 2A.

The array of photo detectors 22 is made of thin film materials, such as amorphous silicon. FIG. 2B illustrates a portion of the array of photo detector elements 22 of FIG. 2A. The array elements are organized in rows and columns with each element consisting of a photo diode 32 and a thin film field effect transistor 34. The cathode of the diode 32 is connected to the source of the transistor 34 and the anodes of all the diodes 32 are connected to a negative bias voltage (−Vb). The gates of the transistors 34 in a row are connected together and this row electrode (row) is connected to the scanning electronics 24 of FIG. 1. The drains of the transistors in a column are connected together and this column electrode (column) is connected to the readout electronics 18 of FIG. 1. The photo diode is a large area diode with an associated capacitance. The large area insures that the photo diode will intercept a large fraction of the light produced in the scintillator 14, and the associated capacitance allows the photo diode to store the resulting electrical signal.

To acquire an x-ray image, the system 10 is operated in the following manner. First, the columns are connected to a known, stable voltage (Vc) provided by the readout electronics 18. This voltage (Vc) should remain constant during normal operation. The rows are connected to a voltage which is positive relative to Vc (Von). The transistor 34 will conduct and a charge will be placed on the capacitance associated with the back biased photo diode 32.

After the diodes have been charged, the rows are connected to a voltage which is negative relative to both Vc and −Vb (−Voff), which turns off the transistors and prevents them from conducting. The detector 12 is then exposed to x-ray photons 36, shown in FIG. 2A. The x-ray photons 36 are converted to lower energy photons 16 by the scintillator 14. When these lower energy photons strike the photo diodes in the detector 12, the diodes conduct and the associated capacitance is partially discharged. The amount of charge removed from the capacitance associated with the back biased diodes depends on the intensity and duration of the light that struck that particular diode within the array. The intensity and duration of the light depends on the intensity and duration of the x-rays striking the scintillator directly above the photo diode. Therefore, the amount of charge removed from any diode in the array is a measure of the intensity and duration of the x-rays striking the scintillator directly above that detector element.

After the x-ray exposure has been terminated, the charge required to restore each diode's capacitance to its initial voltage is read. This is accomplished by connecting the rows, one at a time, to Von and measuring the charge required at the column as the transistor conducts. That row is then returned to −Voff and the elements in the next row are restored and read in a similar fashion.

The charge required to restore the diode to its initial voltage is measured by a converting circuit attached to each column. Because of imperfections in the FET switches, a time-dependent background current is generated when the potential at the gates of the FETs is cycled from −Voff to Von and back to −Voff. This results in an offset signal that is unrelated to the x-ray exposure. In the absence of offsets, the converting circuit would require only the range and resolution of signals generated by an x-ray exposure. In practice, the range of offsets induced by FET imperfections can be larger than the range of useful signals. In the absence of compensation for these offsets, the converting circuit would be required to accommodate an increased input range without sacrificing resolution or speed.

Because of the row-column construction of the detector and because rows are read out sequentially, a portion of the offset is constant for a given row but varies from row to row. This row-variable portion of the offset can be measured or predicted. For example, during a calibration procedure, the average offset of each row can be measured. In one implementation, several images without x-ray exposure are acquired and averaged together to obtain an offset image. The values along rows of the offset image are then averaged to calculate the average offset of each row. Alternatively, the average offset of each row can be predicted from theoretical models.

The measured or predicted row-variable offset value can be used to compensate for these offsets during normal operation of the detector. A means for compensating for row-variable offsets reduces the input range requirement of the converting circuit and is the object of the present invention.

Figure 3:
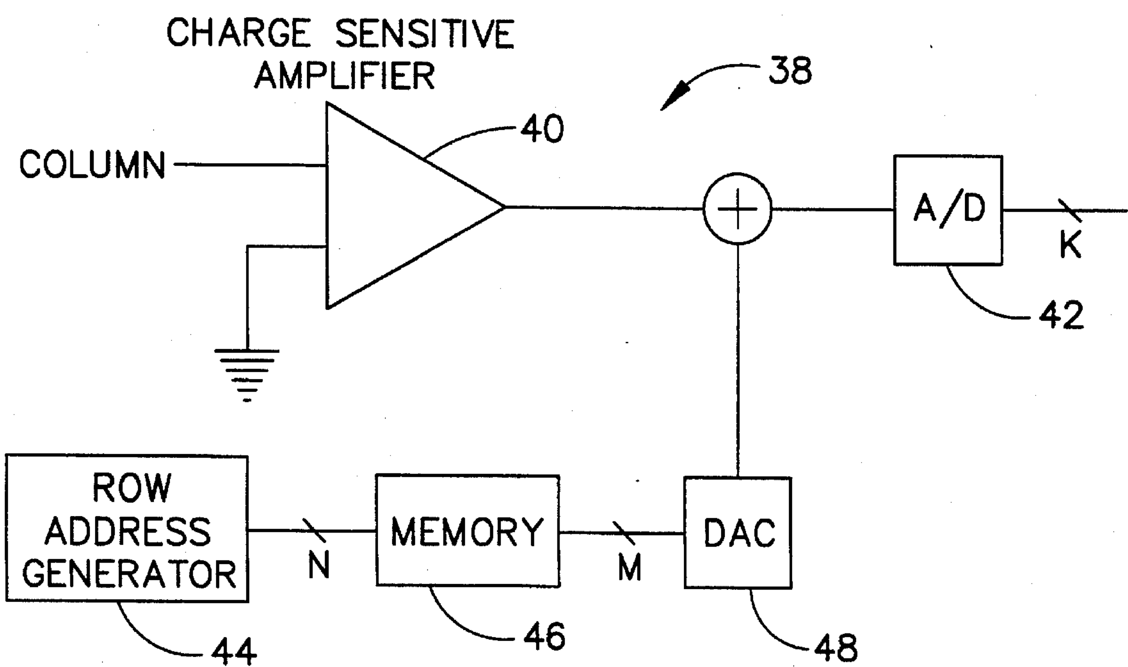
FIG. 3 illustrates a converting circuit according to the present invention which compensates for row variable offsets.

Referring now to FIG. 3, there is illustrated a converting circuit 38 in accordance with the present invention, which compensates for row variable offsets. Each column requires its own sensing circuit, or charge sensitive amplifier, 40. A row variable offset compensation value is provided by row address generator 44, memory 46, and digital to analog converter (DAC) 48. The row address generator 44 provides the memory 46 with an address that is unique for each row. The memory 46 stores a digital representation of the offset compensation value for each row at that row's unique address. The DAC 48 then converts the digital value provided by the memory 46 to an analog voltage. This analog voltage is then added to the signal, which appears as an analog voltage on the output of the charge sensitive amplifier 40. The analog to digital converter (A/D) 42 now converts the analog voltage, which is the sum of the signal and the row offset compensation voltage. The row address generator 44, memory 46, and DAC 48 can be shared for an entire system, i.e., all columns, of readout electronics.

In another embodiment of the present invention, a system is designed to embed the calibration procedure with normal detector operation. In the absence of x-ray exposure, average row offsets are periodically measured, and used to update the offset compensation values in the memory. As a result, optimum offset compensation is maintained without operator intervention in all operating conditions.

It will be obvious to those skilled in the art that various modifications and variations of the present invention are possible without departing from the scope of the invention, which provides a method and system for compensating for row variable offsets in a large area solid state x-ray detector. According to the present invention, a calibration determines variations in offsets from row to row, and the row dependence is then compensated for, using the converting circuit.

The invention has been described in detail with particular reference to certain preferred embodiments thereof, but it will be understood that modifications and variations can be effected within the spirit and scope of the invention.

We claim:

1. A method for compensating for row variable offsets produced by a large area solid state x-ray detector having a row-column construction with the rows being read out sequentially, the method comprising the steps of:

performing a calibration to determine row to row variation in offset by measuring average offset of each row by, acquiring a plurality of images without x-ray exposure, averaging the plurality of images to acquire a resulting average image, and averaging along rows of the resulting average image to acquire row averages;

compensating for the row to row variation in offset.

2. A method for compensating for row variable offsets as claimed in claim 1 wherein the step of compensating for row to row variation in offset further comprises the step of providing a converting circuit for performing the compensation.

3. A method for compensating for row variable offsets as claimed in claim 2 wherein the converting circuit comprises:

a sensing circuit for each column, the sensing circuit having an output;

a row address generator providing a unique address for each row;

a memory for storing a digital representation of an average offset compensation value for each row;

a digital to analog converter to convert the digital representation of the average offset compensation value to an analog voltage value; and a means for summing the sensing circuit output and the average offset compensation voltage for each row.

4. A method for compensating for row variable offsets as claimed in claim 3 wherein the row address generator, memory, and digital to analog converter are common to an entire detector system.

5. An apparatus for compensating for row variable offsets produced by a large area solid state x-ray detector having a row-column construction with the rows being read out sequentially, the apparatus comprising:

means for performing a calibration to determine the row to row variation in offset by measuring average offset in each row including means for averaging a plurality of images acquired without x-ray exposure to acquire a resulting average image, and means for averaging along rows of the resulting average image to acquire row averages;

means for compensating for the row to row variation in offset.

6. An apparatus for compensating for row variable offsets as claimed in claim 5 wherein the means for compensating for the row to row variation in offset further comprises a converting circuit for performing the compensation.

7. An apparatus for compensating for row variable offsets as claimed in claim 6 wherein the converting circuit comprises:

a sensing circuit for each column, the sensing circuit having an output;

a row address generator providing a unique address for each row;

a memory for storing a digital representation of an average offset compensation value for each row;

a digital to analog converter to convert the digital representation of the average offset compensation value to an analog voltage value; and a means for summing the sensing circuit output and the average offset compensation voltage for each row.

8. An apparatus for compensating for row variable offsets as claimed in claim 7 wherein the row address generator, memory, and digital to analog converter are common to an entire detector system.

* * * * *